United States Patent
Bertrams et al.

(10) Patent No.: US 6,241,077 B1
(45) Date of Patent: Jun. 5, 2001

(54) TRANSPORT SYSTEM FOR SPINNING BOBBINS AND BOBBIN TUBES WITH A TRANSPORT PATH BRIDGING A PASSAGE

(75) Inventors: Josef Bertrams, Wegberg; Dieter Spinnen; Bernd Brauer, both of Mönchengladbach; Hans-Jakob Reuters, Viersen; Ute Lindemann, Erkelenz; Bernd Lörsch, Übach-Palenberg, all of (DE)

(73) Assignee: W. Schlafhorst AG & Co. (DE)

( * ) Notice: Subject to any disclaimer, the term of this patent is extended or adjusted under 35 U.S.C. 154(b) by 0 days.

(21) Appl. No.: 09/290,481

(22) Filed: Apr. 12, 1999

(30) Foreign Application Priority Data

Apr. 10, 1998 (DE) .............................. 198 16 232

(51) Int. Cl.⁷ .................................................. B65G 15/00
(52) U.S. Cl. .................................. 198/690.1; 242/35.5 A
(58) Field of Search ..................... 198/690.1; 242/35.5 A

(56) References Cited

U.S. PATENT DOCUMENTS

| | | | | |
|---|---|---|---|---|
| 3,834,519 | * | 9/1974 | Kitazawa et al. | 198/41 |
| 3,858,710 | * | 1/1975 | Spodig | 198/41 |
| 3,876,064 | * | 4/1975 | Morton | 198/287 |
| 4,212,433 | * | 7/1980 | Matsui et al. | 242/35.5 |
| 4,236,632 | * | 12/1980 | Spodig | 198/690 |
| 4,315,568 | * | 2/1982 | Mojden | 198/690 |
| 4,697,692 | * | 10/1987 | Kupper et al. | 198/464.3 |
| 4,727,991 | * | 3/1988 | Mojden et al. | 209/588 |
| 4,907,688 | * | 3/1990 | Kupper | 198/463.4 |
| 5,175,990 | * | 1/1993 | Fritschi et al. | 57/281 |
| 5,190,136 | * | 3/1993 | Grecksch et al. | 198/372 |
| 5,295,570 | * | 3/1994 | Grecksch et al. | 198/465.1 |
| 5,297,671 | * | 3/1994 | Ruth | 198/803.12 |
| 5,768,876 | * | 6/1998 | Messing | 57/281 |
| 5,816,385 | * | 10/1998 | Ootuski et al. | 198/690.1 |
| 5,848,684 | * | 12/1998 | Furlani et al. | 198/805 |
| 5,865,298 | * | 2/1999 | Furlani et al. | 198/805 |
| 5,871,084 | * | 2/1999 | Kasik | 198/803.6 |
| 6,056,879 | * | 5/2000 | Schaaf et al. | 210/695 |

FOREIGN PATENT DOCUMENTS

| | | |
|---|---|---|
| 656 181 | 10/1960 | (DE) . |
| 1 132 487 | 6/1962 | (DE) . |
| 1 155 394 | 10/1963 | (DE) . |
| 36 30 670 C2 | 4/1989 | (DE) . |
| 40 11 797 A1 | 12/1990 | (DE) . |
| 40 19 099 A1 | 12/1991 | (DE) . |
| 42 05 499 A1 | 8/1993 | (DE) . |
| 43 13 168 A1 | 10/1994 | (DE) . |
| 296 05 595 U1 | 3/1997 | (DE) . |
| 0 328 995 A1 | 2/1989 | (EP) . |
| 1 572 062 | 4/1977 | (GB) . |

* cited by examiner

*Primary Examiner*—Joseph E. Valenza
*Assistant Examiner*—Rashmi Sharma
(74) *Attorney, Agent, or Firm*—Kennedy Covington Lodbell & Hickman, LLP

(57) ABSTRACT

A transport system for spinning bobbins and bobbin tubes comprises a transport path with two essentially vertical sections and an essentially horizontal section connected therebetween. The spinning bobbins and bobbin tubes are transported on pallets whose foot portion comprises an element consisting of magnetizable material. A conveyor belt runs along the transport path at the back side of which belt stationarily arranged permanent magnets are arranged to exert magnetic forces to hold the pallets on the conveyor belt.

15 Claims, 3 Drawing Sheets

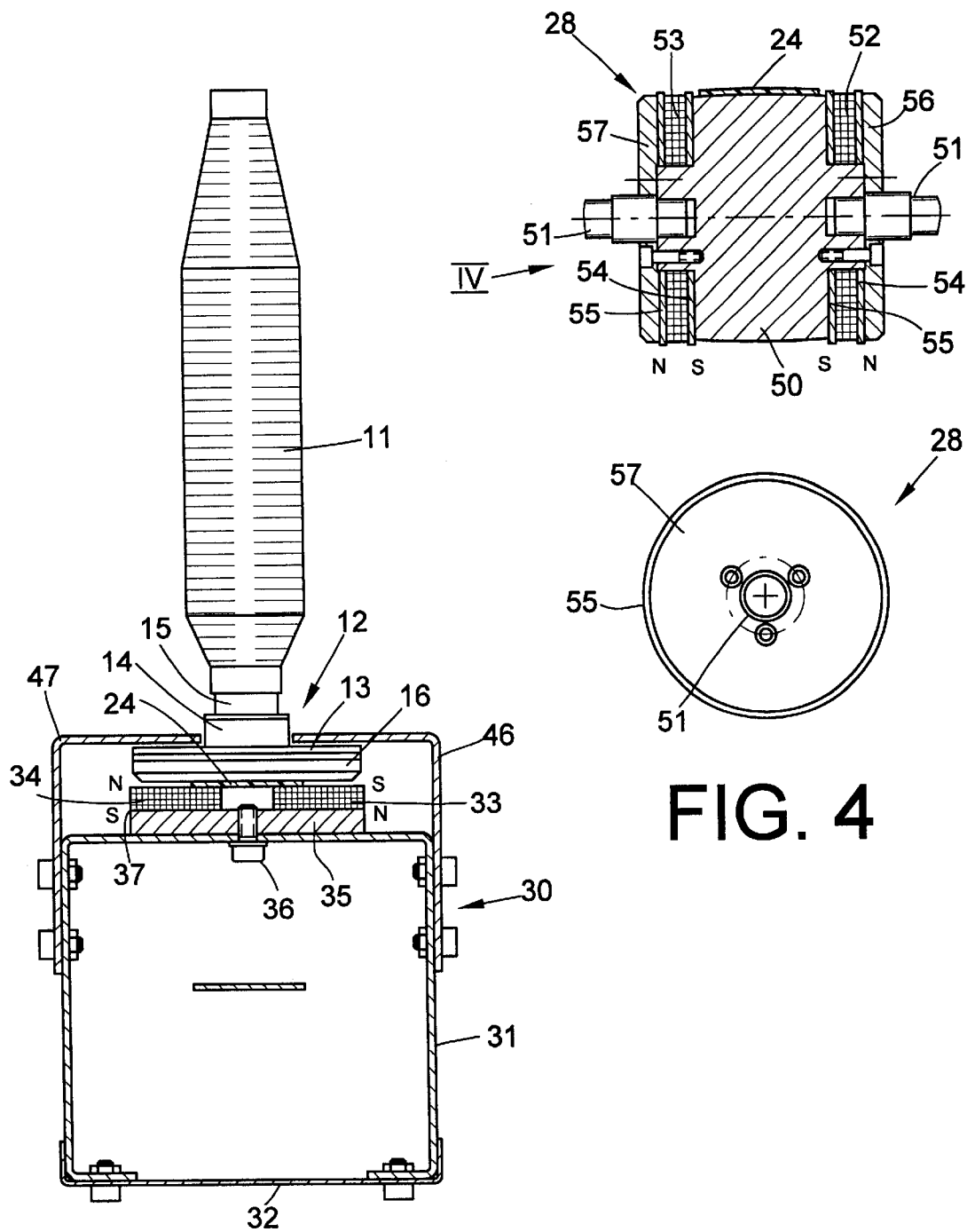
FIG. 2
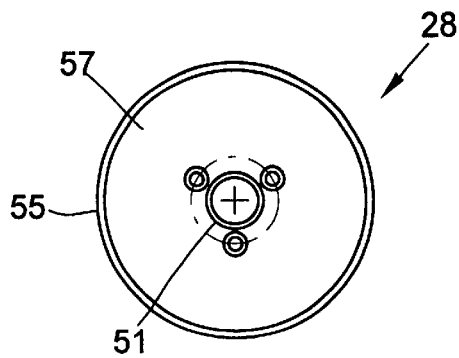
FIG. 3
FIG. 4

FIG. 7 FIG. 6 FIG. 5
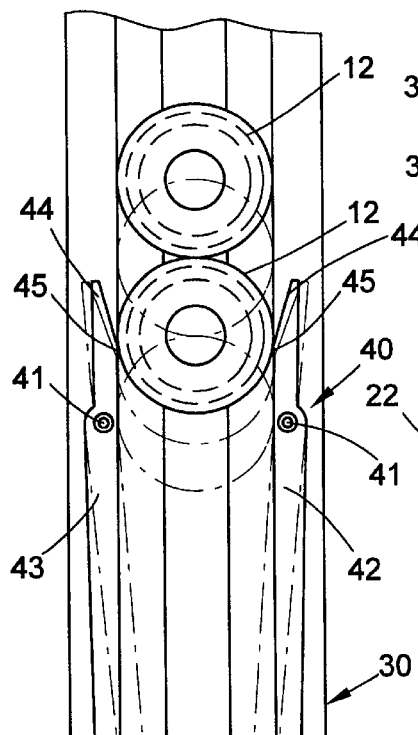
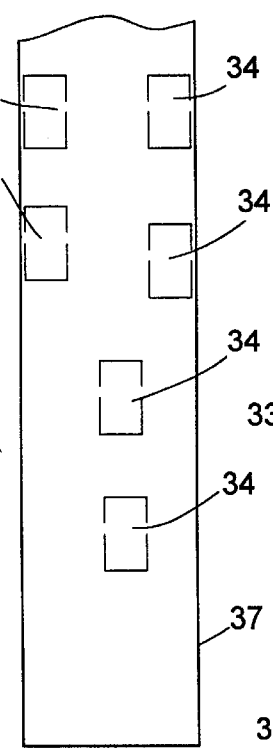
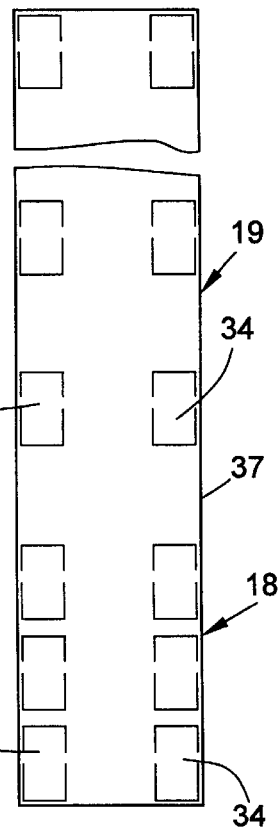
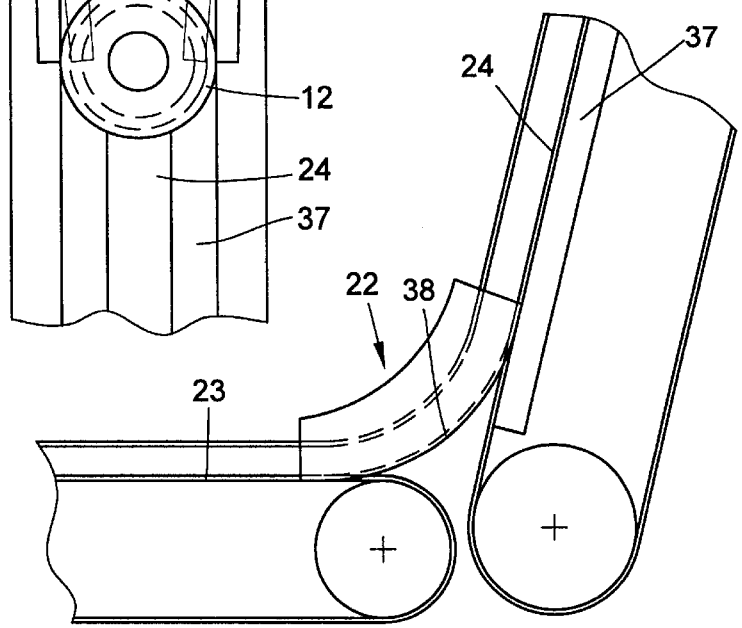
FIG. 8

TRANSPORT SYSTEM FOR SPINNING BOBBINS AND BOBBIN TUBES WITH A TRANSPORT PATH BRIDGING A PASSAGE

FIELD OF THE INVENTION

The present invention relates to a transport system for spinning bobbins and bobbin tubes supported on pallets having a foot portion with an element formed of magnetizable material on which permanent magnets act during transport along a transport path bridging a passage wherein the transport path comprises two essentially vertical sections and an essentially horizontal section connected therebetween.

BACKGROUND OF THE INVENTION

In a transport system of the initially cited type (German Patent Publication DE 40 11 797 A1) the disk-shaped or ring-shaped foot portions of the pallets are provided with a ring of magnetizable material, especially with a steel ring. These pallets are customarily transported on horizontally running conveyor belts on which they stand upright by their foot portion. In order to be able to carry out transport in a vertical direction in this transport system a rotating belt aligned in vertical direction is provided and is equipped at set intervals with permanent magnets arranged in pairs. The pallets brought up by a conveyor belt are tipped to the side and subsequently taken by the magnets in such a manner that the spinning bobbins or bobbin tubes are horizontally aligned. The pallets are tipped back at the upper end of the belt and taken by a conveyor belt. In order to transport the pallets back down again at the end of a passage, a second belt is provided which is also equipped with permanent magnets so that the process can be repeated in the reverse order.

It is also known (German Patent Publication DE 36 30 670 C2) that pallets can be transported on a transport path with two essentially vertical sections and one horizontal section by means of a conveyor belt. In this construction, the conveyor belt is provided with an additional belt-shaped frictional member. The pallets are pressed against the frictional member in such a manner by guide bars or arms acting upon their top that a frictional action sufficient for entrainment is obtained. The tops of the foot portions of the pallets thereby slide on the guide bars.

SUMMARY OF THE INVENTION

The present invention thus has the objective of addressing the problem of creating a transport system of the initially cited type which is designed in a simple manner and which largely avoids wear to the pallets.

This problem is solved in that at least one conveyor belt runs along the transport path, the back side of which belt is associated with stationarily arranged permanent magnets distributed over the transport sections, the magnetic forces of which magnets hold the pallets on the conveyor belt.

In such a design according to the invention, the frictional forces between the conveyor belt and the foot portions of the pallets necessary for transport up and down essentially vertical transport sections are applied by the magnetic forces so that the pallets themselves do not slide on any components which would expose them to wear.

An advantageous embodiment of the invention provides that the conveyor belt is guided on the transport path on a slide of non-magnetizable material on whose side facing away from the conveyor belt the permanent magnets are arranged. The slide assures that even the conveyor belt is not loaded too heavily and exposed to elevated wear.

An advantageous embodiment provides that the permanent magnets are magnetized vertically to the slide. As a result thereof the magnetic forces of the permanent magnets can be fully utilized. It is further provided with advantage that the permanent magnets are arranged in pairs spaced in the direction of transport and transversely thereto. The permanent magnets of each pair are oppositely polarized. This forms a magnetic field which runs through the magnetizable elements of the pallets so that they are securely held.

In order to utilize the magnetic forces as well as possible it is further provided that the permanent magnets are connected with each other on the side facing away from the slide by a yoke of magnetizable material. It is advantageously provided that the yoke is designed in the form of a rail attached to a frame and extending in the direction of transport with a plurality of the permanent magnets attached thereto. The yoke can thereby be integrated into the frame necessary for the transport path.

It is advantageously provided that the pallets are surrounded at their foot portion by a ring of magnetizable material and that the conveyor belt has a width which is less than the diameter of the rings. These rings permit a reliable introduction of force into the pallets. This introduction of force is also not disturbed by the conveyor belt, which has a lesser width, so that the magnetic forces pass without hindrance from the permanent magnets to the rings.

The pallets must be accelerated and deflected upward at the receiving position, so that the greatest transport forces are required thereat. For this reason, a zone of stronger magnetic forces is provided in the area of a receiving location at the beginning of the first, essentially vertical section in the direction of the transport path.

Lesser magnetic forces are required at the delivery location, especially in order to be able to carry out a separation of the pallets from the magnets relatively easily. For this reason, a zone of weaker magnetic forces is provided in the area of a delivery location of the second, essentially vertical section of the transport path.

In order to assure that the pallets are delivered in upright form at the delivery position, a separating guide for the pallets is provided between the delivery location of the second section and between a transport element following it at an angle of approximately 90°. This separating guide assures that the pallets are loosened at the end of the second section in a defined manner from the conveyor belt so that they are passed on in upright position to the following transport element, which is also a conveyor belt in most instances.

In order to avoid a backup of pallets in the area of the delivery position the second section of the transport path is provided in front of the delivery position with an individualizing device. This individualizing device, which is known in principle, e.g., from German Patent Publication DE 42 05 499 A1, assures that the pallets do not pass to the delivery position following each other directly.

In order to be able to deflect the pallets between the essentially vertical sections and the horizontal section at as acute an angle as possible, it is provided that the arrangement of permanent magnets is interrupted in the area of deflection positions for the conveyor belts and that deflection rollers for the conveyor belt, which rollers are also equipped with permanent magnets, are provided thereat. The permanent magnets rotate with the deflection rollers and assume the holding of the pallets in this area. The magnetic flux must also not pass through the conveyor belt in this area. Such deflection rollers equipped with permanent magnets can be used with advantage even in other bridge-like transport paths, e.g., in transport paths whose vertical or approximately vertical sections and/or horizontal sections are designed in accordance with German Patent Publication DE 36 30 670.

An advantageous embodiment provides that the permanent magnets are arranged between disks of magnetizable material which project over the circumference of the deflection roller and are flattened off to a polygonal shape. As a result of this polygonal form, acute-angled deflections of the pallets can be realized even though the diameter of the deflection rollers is maintained relatively small.

Further features and advantages of the present invention will be described and understood from the following description of the exemplary embodiments shown in the drawings.

BRIEF DESCRIPTION OF THE DRAWINGS

FIG. 2 is a cross-section of the transport system of FIG. 1 taken along line II—II thereof.

FIG. 3 is another cross-section of the transport system of FIG. 1 taken along line III—III thereof through a deflection roller.

FIG. 4 is an elevational view of the deflection roller of FIG. 3 viewed in the direction of arrow IV in FIG. 3.

FIG. 5 is an elevational view taken in the direction of arrow V in FIG. 1 showing a preferred magnet arrangement in the area of the receiving position of the transport system.

FIG. 6 is an elevational view taken in the direction of arrow VI in FIG. 1 showing a preferred magnet arrangement in the area of the delivery position of the transport system.

FIG. 7 is an elevational view taken in the direction of arrow VII in FIG. 1 showing a preferred form of individualizing device.

FIG. 8 is a partial side elevational view of the area of the delivery position of the transport system of FIG. 1.

DESCRIPTION OF THE PREFERRED EMBODIMENT

Figure 1:
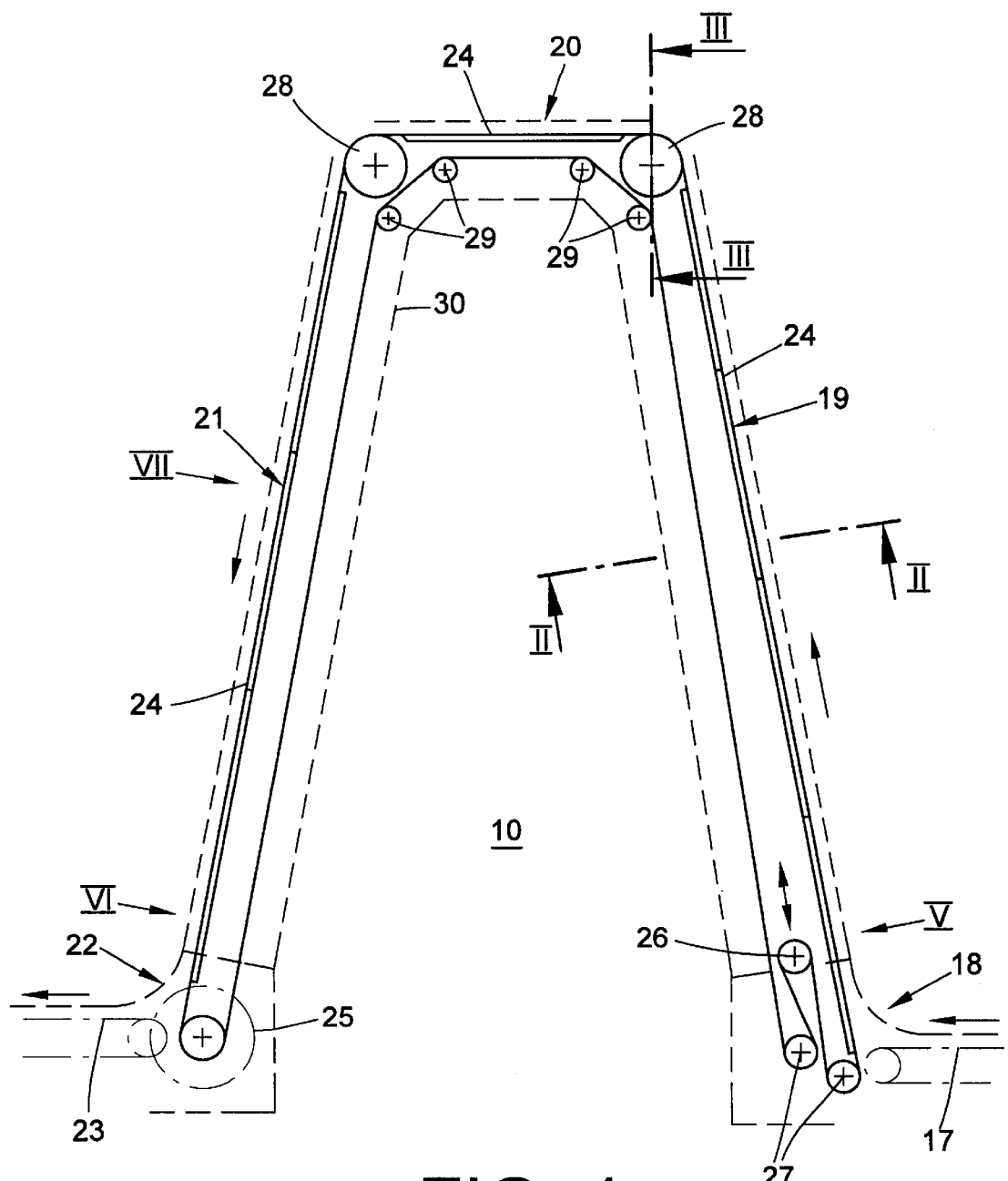
FIG. 1 is a schematic side elevational view of a transport system according to a preferred embodiment of the present invention providing a transport path in the form of a bridge extending over a passage.

Referring now to the accompanying drawings, a transport path shown in FIG. 1 forms a bridge, a so-called cop bridge, which extends over a passage 10 between two successive machines. This cop bridge can be arranged, e.g., in a transport system between a bobbin winding machine and a ring spinning machine or between a bobbin winding machine and a loading device. In this transport system spinning bobbins 11 (FIG. 2) and bobbin tubes are transported while supported in upstanding disposition on a pallet 12. Pallet 12 comprises a foot portion 13 designed as a ring or disk and centrally provided with a neck 14. This neck is followed by pin 15 which is reduced in diameter and onto which either a yarn-wound spinning bobbin 11 or an empty bobbin tube is inserted. Foot portion 13 is surrounded by ring 16 of magnetizable steel.

Pallets 12 are supplied with spinning bobbins 11 or bobbin tubes by means of horizontally running supply conveyor belt 17 and are delivered to receiving position 18 of a first section 19 of the bridge-like transport path which section 19 is inclined to the vertical. A horizontal section 20 follows this first section 19, which section 20 is followed by section 21, which is also inclined to the vertical and extends downwardly again. At the lower end of section 21, pallets 12 are delivered at delivery position 22 to removal conveyor belt 23 extending away therefrom in a horizontal direction.

In practice, pallets 12 are transported in the manner of a closed loop along which pallets with empty bobbin tubes are transported along one track in one direction and pallets with yarn-wound spinning bobbins 11 are transported in another direction. In such instance, two bridge-like transport paths are arranged one behind the other in the view of FIG. 1 and operate to transport pallets in a mirror-image relation to one another.

The bridge-like transport path comprises conveyor belt 24 rotating endlessly over sections 19, 20 and 21. The conveyor belt is provided in the area of delivery position 22 with drive 25, which is only schematically indicated. A tensioning device with tensioning roller 26 is provided in the area of receiving position 18 for conveyor belt 24 which device tensions the conveyor belt between two deflection rollers 27. A deflection roller 28 is arranged between sections 19, 20 and between sections 20, 21, the arrangement of which rollers will be explained later in detail with reference made to FIGS. 3 and 4. The returning run of conveyor belt 24 is guided in the area of deflection rollers 28 over rollers 29.

The bridge-like transport path comprises portal-shaped frame 30 indicated in dotted lines in FIG. 1. As FIG. 2 shows, the frame is essentially formed by bent sheet profile 31, which has an essentially U-shaped cross section and whose open side is closed by sheet cover 32. Sheet profile 31 consists of a non-magnetizable material, e.g. aluminum. As can be seen from FIG. 2, the returning run of the conveyor belt lies within frame 30 whereas the operative transport run of the conveyor belt 24 travels outside of the frame.

In order to be able to reliably transport pallets 12 with conveyor belt 24 in the essentially vertical sections 19, 21 a permanent magnet arrangement is provided which holds pallets 12 on conveyor belt 24 and also prevents pallets 12 from tipping or falling off.

As can be seen from FIGS. 2, 5 and 6, permanent magnets 33, 34 are arranged in pairs at the back side of the conveyor belt at spacings transversely and longitudinally to the direction of transport by the conveyor belt. The permanent magnets are connected on their side facing away from conveyor belt 24 to yoke 35 which extends in the form of a rail or plate in the direction of belt transport and is fastened to the outside of sheet profile 31 by screws 36. Permanent magnets 33, 34 are covered in the direction of conveyor belt 24 by slide sheet 37 consisting of a highly alloyed, non-magnetizable steel sheet. Permanent magnets 33, 34 are adhered to yoke 35 and slide sheet 37. Yoke 35 is formed in sections with magnets 33, 34 and slide sheet 37, which sections are arranged in series with each other in such a manner that they extend over the area from receiving position 18 to the first deflection roller 28 as well as from the area of the opposite deflection roller 28 to delivery position 22. A corresponding section with permanent magnets 33, 34 can be provided in horizontal section 20. However, since the pallets are disposed in upstanding orientation with sufficient force on conveyor belt 24 in this section 20 on account of their intrinsic weight, a guide sheet without permanent magnets can also be provided here. The sections arranged in series against each other form a slide with their slide sheets 37 on which slide the inside of conveyor belt 24 slides.

Permanent magnets 33, 34 manufactured as flat, rectangular bodies of hard ferrite are polarized vertically to the plane of conveyor belt 24 and the slide. Permanent magnets 33, 34 are aligned in pairs in such a manner that they are polarized oppositely to one another. As FIG. 2 shows, conveyor belt 24 has a width corresponding to approximately half of the width of the outer intervals of the pairs of permanent magnets 33, 34. Steel ring 16 of pallets 12 has a diameter corresponding approximately to the outer interval of permanent magnets 33, 34. This design results in a good magnetic flux from permanent magnets 33, 34 to ring 16. Conveyor belt 24, which is provided with one or more fabric inserts, has a relatively small thickness on the order of 2 mm or less so that the magnetic flux is not significantly disturbed even by the belt thickness.

Pallets 12 are deflected by approximately or nearly 90° in the area of receiving position 18, during which spinning bobbins 11 or bobbin tubes taken up by them move out of a vertical position into an approximately horizontal position. In order that this course of movement takes place in a reliable manner and the pallets pass securely onto conveyor belt 24, the permanent magnets are purposefully arranged to exert relatively great magnetic forces between pallets 12 and permanent magnets 33, 34 in the area of receiving position 18. These relatively great forces, which are, e.g., on the order of 27 N, are achieved in the exemplary embodiment in that permanent magnets 33, 34 are arranged in close sequence in the area of receiving position 18. After this receiving position 18 lesser magnetic forces are sufficient for a reliable transport of pallets 12 so that it is sufficient to arrange the equally large and equally strong permanent magnets 33, 34 in pairs at a greater interval, e.g., at an interval on the order of 60 mm. It is furthermore desirable to purposefully reduce the magnetic forces in the area of delivery position 22 so that this facilitates a separation of pallets 12 from conveyor belt 24 and their transfer to following conveyor belt 23. As FIG. 6 shows, the magnetic force is reduced for this reason in the area of delivery position 22 by means of the number of permanent magnets present thereat. Instead of a paired arrangement of permanent magnets 33, 34 in the area of delivery position 22 only individual permanent magnets 34 are provided which, in addition, are moved from the edge area somewhat closer to the middle.

In order to facilitate the delivery of the pallets in the area of delivery position 22, separation guide 38 is furthermore provided in the area of the delivery position, which guide causes pallets 12 to move along a rounded guide track from conveyor belt 24 to conveyor belt 23. In the exemplary embodiment according to FIG. 8, the separation guide consists of an appropriately rounded sheet which is recessed like a fork in the area of conveyor belt 24 and rests with two prongs or flanges adjacent to conveyor belt 24 on slide sheet 37 located thereat. Separation guide 38 is adjustably fastened to frame 30 in a manner not shown in more detail. A similar guide can be provided in the area of receiving position 18, although this is not absolutely necessary, however.

As FIG. 7 shows, individualizing device 40 is provided in the area of section 21 in front of delivery position 22, which device assures that the pallets pass individually and at a set interval to delivery position 22 to be transported downstream therefrom. This individualizing device 40, which corresponds in principle to the individualizing device according to German Patent Publication DE 42 05 499 A1, comprises two levers 42, 43 which can pivot about shafts 41 running vertically to conveyor belt 24. Levers 42, 43 comprise guide surfaces associated with the foot portion of pallets 12. The guide surfaces of levers 42, 43 are arranged in a mirror-image manner relative to conveyor belt 24 and comprise intake slopes 44 extending to edges 45 which form a stop in the position shown in FIG. 7 with dotted lines, that is, which are spaced apart by an interval transversely to the conveyor belt which is less than the diameter of the foot portion of a pallet 12. In order to allow a pallet 12 to pass, levers 42, 43 must be pivoted outward from the foot portion of a pallet 12 upstream from shafts 41, as is shown in dotted lines. In the direction of transport after shafts 41 the guide edges of levers 42, 43 extend in a straight line and in the position shown in dotted lines they run parallel to each other. In this position they maintain an interval which corresponds with a slight play to the diameter of the foot portion of a pallet 12. Thus, the two levers 42, 43 are supported externally against the foot portion of a pallet 12 as long as a pallet is located in their range. This prevents the ends of the levers upstream from shafts 41 from being pivoted outwardly. Corners 45 thereby form a stop which retains the following pallet which stop is not released until the preceding pallet 12 has moved beyond the range of levers 42, 43.

The pallets are secured in the area of section 19, 20, 21 as well in the area of belts 17, 23 by guide sheets which are arranged so that they maintain a spacing vertically to the particular conveyor belts 17, 23, 24 which is greater than the thickness of the foot portion and which leave a slot between themselves which is wider than neck 14 of a pallet. These guide sheets serve to secure the pallets against tilting and falling down without, however, having any other guide task. As can be seen from FIG. 2, such guide sheets 46, 47 in the area of frame 30 are fastened by screws to frame 30 and are formed of non-magnetizable material.

As FIG. 1 shows, the magnet guides are interrupted in the transition between section 19 and section 20 and in the transition between section 20 and section 21. Deflection rollers 28 are arranged in these transitions which rollers are shown in more detail in FIGS. 3, 4. The deflection rollers consist of a roller body 50 of non-magnetizable material, e.g., of aluminum. Axle pins 51 are inserted in these roller bodies 50 with which pins deflection rollers 28 are supported in frame 30 by antifriction bearings, e.g., ball bearings or roller bearings, in a manner not shown in more detail. Roller body 50 is provided laterally with two ring magnets 52, 53 which are arranged at an interval greater than the width of conveyor belt 24. The two ring magnets 52, 53 are axially polarized and arranged in such a manner that their polarization is opposite. Ring magnets 52, 53 are arranged between ring disks 54, 55 of magnetizable material, especially of steel. Cover disks 56, 57 are attached on the outside which are fastened by screws to roller body 50.

Ring disks 54, 55 project outward over the circumference of roller body 50, by a dimension on the order of the thickness of conveyor belt 24. Ring disks 54, 55 are shaped by means of flat areas into a polygonal form, as can be seen from FIG. 3. It is possible, based on the polygonal form, to provide deflection rollers 28 with a relatively small diameter and nevertheless deflect the pallets reliably around the correspondingly small radius.

As can be seen from FIGS. 5 and 6 as well as from FIG. 3, permanent magnets 33, 34 and magnet rings 52, 53 are arranged in such a manner that they do not lie in the central range of the foot portion of pallets 12. Therefore, the magnetic flux does not result in a disturbance of a memory, computer or like microelectronic chip which can be placed in the middle of the foot portion of a pallet 12 and can be coded with information.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A transport system for spinning bobbins and bobbin tubes each supported on a pallet having a foot portion including an element of magnetizable material to be acted upon by permanent magnets during transport along a transport path bridging a passage, wherein the transport path comprises at least one conveyor belt traveling along two essentially vertical sections and an essentially horizontal section connected therebetween and stationarily arranged permanent magnets associated with an underside of the at least one conveyor belt along the essentially vertical sections for exerting magnetic attractive forces on the magnetizable material of the foot portions of the pallets to hold the pallets on the conveyor belt, and further comprising the permanent magnets being arranged to provide a zone of stronger magnetic forces in the area of a receiving position at the beginning of a first one of the essentially vertical sections of the transport path.

2. The transport system according to claim 1, wherein the transport path comprises a slide of non-magnetizable material on which the conveyor belt is guided, the slide having a side facing away from the conveyor belt on which the permanent magnets are arranged.

3. The transport system according to claim 2, wherein the permanent magnets are magnetized vertically to the slide.

4. The transport system according to claim 3, wherein the permanent magnets are arranged in pairs spaced longitudinally and transversely relative to the direction of transport of the transport path with the permanent magnets of each pair being oppositely polarized.

5. The transport system according to claim 3, wherein the permanent magnets are connected with each other on a side thereof facing away from the slide by a yoke of magnetizable material.

6. The transport system according to claim 5, wherein the yoke comprises a rail attached to a frame and extending in the direction of transport with a plurality of the permanent magnets attached to the rail.

7. The transport system according to claim 1, wherein magnetizable material of the foot portion of each pallet comprises a ring of magnetizable material surrounding the foot portion and wherein the conveyor belt has a width which is less than the diameter of the rings.

8. The transport system according to claim 1, wherein the permanent magnets are arranged to provide a zone of weaker magnetic forces in the area of a delivery position of a second one of the essentially vertical sections of the transport path.

9. The transport system according to claim 8, wherein the transport path further comprises a separation guide for the pallets between the delivery position of the second essentially vertical section and a transport element arranged downstream thereof at an angle thereto of approximately 90°.

10. The transport system according to claim 8, wherein the second essentially vertical section of the transport path comprises an individualizing device in front of the delivery position.

11. The transport system according to claim 1, wherein the transport path comprises deflection rollers for the conveyor belt in the areas of deflection positions between the essentially vertical sections and the essentially horizontal section of the transport path, the deflection rollers including permanent magnets associated therewith.

12. The transport system according to claim 11, wherein the deflection rollers comprise a body of non-magnetizable material with ring-shaped permanent magnets arranged at opposite widthwise sides of the conveyor belt.

13. The transport system according to claim 12, wherein the ring-shaped permanent magnets are axially polarized.

14. The transport system according to claim 13, wherein the two ring-shaped permanent magnets are oppositely polarized.

15. The transport system according to one of claims 11, wherein the permanent magnets are arranged between polygonal disks of magnetizable material which project over a body portion of the deflection roller.

* * * * *